(12) United States Patent
Agrawal (10) Patent No.: US 11,852,417 B2
(45) Date of Patent: Dec. 26, 2023

(54) COOLING APPARATUS AND A METHOD FOR COOLING A WATERFLOW

(71) Applicant: JS Creates Pte. Ltd., Singapore (SG)

(72) Inventor: Avichal Agrawal, Singapore (SG)

(73) Assignee: JS Creates Pte. Ltd., Singapore (SG)

( * ) Notice: Subject to any disclaimer, the term of this patent is extended or adjusted under 35 U.S.C. 154(b) by 0 days.

(21) Appl. No.: 17/286,308

(22) PCT Filed: Oct. 17, 2019

(86) PCT No.: PCT/SG2019/050514
§ 371 (c)(1),
(2) Date: Apr. 16, 2021

(87) PCT Pub. No.: WO2020/081009
PCT Pub. Date: Apr. 23, 2020

(65) Prior Publication Data
US 2021/0310740 A1     Oct. 7, 2021

(30) Foreign Application Priority Data

Oct. 17, 2018   (SG) ........................... 10201809128Q (51) Int. Cl.
*F28C 1/06* (2006.01)
*F28C 1/02* (2006.01)
(Continued)

(52) U.S. Cl.
CPC .................. *F28C 1/02* (2013.01); *F28C 1/06* (2013.01); *F28F 13/06* (2013.01); *F28F 25/02* (2013.01); *F28F 25/12* (2013.01)

(58) Field of Classification Search
CPC ...... F28C 1/02; F28C 1/06; F28C 1/10; F28F 25/12; F28F 25/02; F28F 2025/005
See application file for complete search history.

(56) References Cited

U.S. PATENT DOCUMENTS 3,917,764 A   11/1975  Phelps
7,603,774 B2  10/2009  Facius et al.
(Continued)

FOREIGN PATENT DOCUMENTS

CN   201909557      7/2011
CN   102192663 A    9/2011
(Continued)

OTHER PUBLICATIONS

International Search Report for International Application No. PCT/SG2019/050514, dated Jan. 24, 2020, 3 pgs.
(Continued)

*Primary Examiner* — Eric S Ruppert
(74) *Attorney, Agent, or Firm* — Patent Law Works LLP (57) ABSTRACT

A cooling apparatus for cooling a waterflow is provided. Cooling apparatus includes a first evaporative cooler adapted to cool the waterflow therethrough, a second evaporative cooler adapted to receive and cool the waterflow from the first evaporative cooler therethrough, wherein the second evaporative cooler is adapted to receive an airflow therethrough to cool the waterflow therethrough and the first evaporative cooler is adapted to receive the airflow therethrough from the second evaporative cooler to cool the waterflow therethrough, and a deflector adapted to deflect the waterflow from the first evaporative cooler to the second evaporative cooler and allow the airflow from the second evaporative cooler to the first evaporative cooler therethrough. A cooling method for cooling a waterflow is also provided.

18 Claims, 6 Drawing Sheets

(51) Int. Cl.
    *F28F 13/06*    (2006.01)
    *F28F 25/02*    (2006.01)
    *F28F 25/12*    (2006.01)

(56) References Cited

U.S. PATENT DOCUMENTS

| | | | |
|---|---|---|---|
| 9,891,001 | B2 | 2/2018 | Bugler et al. |
| 2007/0187851 | A1 | 8/2007 | Facius et al. |
| 2009/0283245 | A1* | 11/2009 | Hentschel ............ F28F 27/003 165/100 |
| 2013/0269924 | A1 | 10/2013 | Bugler et al. |
| 2014/0361450 | A1* | 12/2014 | Curtis .................... F28F 25/04 261/110 |
| 2017/0067703 | A1* | 3/2017 | Bean, Jr. .................. F28B 9/08 |
| 2017/0082370 | A1 | 3/2017 | Strumenti et al. |
| 2018/0094884 | A1 | 4/2018 | Rousselet et al. |

FOREIGN PATENT DOCUMENTS

| | | | |
|---|---|---|---|
| CN | 106662405 | A | 5/2017 |
| DE | 314739 | C | 10/1919 |
| GB | 571292 | A | 8/1945 |
| KR | 20040049568 | A * | 6/2004 |
| KR | 100526758 | B1 | 11/2005 |
| KR | 20060021945 | A * | 3/2006 |
| KR | 100645228 | B1 | 11/2006 |
| KR | 20110072825 | A | 6/2011 |

OTHER PUBLICATIONS

European Patent Office, Communication Extended Search Report, Application No. 198738833 JS Creates Pte Ltd, dated Jun. 15, 2022, 30 pgs.

Saudi Authority for Intellectual Property, Notification of the Substantive Examination Report, Application No. 521421759 JS Creates Pte Ltd, dated Jun. 30, 2022, 10 pgs w/translation.

\* cited by examiner

COOLING APPARATUS AND A METHOD FOR COOLING A WATERFLOW

CROSS-REFERENCE TO RELATED APPLICATIONS

The present application is a national phase entry under 35 U.S.C. § 371 of International Patent Application No. PCT/SG2019/050514, filed Oct. 17, 2019, designating the United States of America and published in English as International Patent Publication WO2020/081009 on Apr. 23, 2020, which claims the benefit to Singapore Patent Application No. 10201809128Q filed on Oct. 17, 2018, the entireties of which are incorporated by reference herein.

TECHNICAL FIELD

The present invention relates to a cooling apparatus for cooling a waterflow and a method for cooling the waterflow. For example, a cooling tower for cooling a waterflow and a method thereof.

BACKGROUND

Cooling apparatus, e.g. cooling tower, are used in buildings to cool water to be used in a building, e.g. for air-conditioning. In a conventional cross-flow cooling apparatus, dry ambient air passes horizontally through an infill while water flows vertically down through the infill, thereby crossing the water flow, hence the cross-flow cooling apparatus. However, such cross-flow cooling apparatus has a relatively low thermal effectiveness and efficiency. As the airflow crosses the water flow, the air gets saturated with water vapour and, in turn, cools the water through the infill. However, the air exiting the infill through its upper end is heated up due to the higher temperature water entering the infill, while the air exiting the infill at its lower end is comparatively cooler since the water loses heat as it falls through the infill. Hence, lower end of the infill is kept at a lower temperature. The air is then exhausted by an exhaust fan at the top portion of the cooling apparatus. The exiting air is a mixture of hot saturated and cool saturated airflows. This mixture limits the thermal effectiveness of the conventional cooling apparatus. Counter-flow cooling tower are design to overcome this limitation. While this limitation is resolved, the airflow resistance for such cooling tower is very high, such that the amount of airflow through the cooling apparatus is reduced. Consequently, the moisture carrying capacity of the airflow is reduced which again limits the thermal effectiveness of the cooling apparatus.

Therefore, it is necessary to improve the thermal effectiveness and efficiency of such cooling apparatus.

SUMMARY

According to various embodiments, a cooling apparatus for cooling a waterflow is provided. Cooling apparatus includes a first evaporative cooler adapted to cool the waterflow therethrough, a second evaporative cooler adapted to receive and cool the waterflow from the first evaporative cooler therethrough, wherein the second evaporative cooler is adapted to receive an airflow therethrough to cool the waterflow therethrough and the first evaporative cooler is adapted to receive the airflow therethrough from the second evaporative cooler to cool the waterflow therethrough, and a deflector adapted to deflect the waterflow from the first evaporative cooler to the second evaporative cooler and allow the airflow from the second evaporative cooler to the first evaporative cooler therethrough.

According to various embodiments, the deflector may include a first side and a second side behind the first side, such that the deflector may be adapted to direct the waterflow from the first evaporative cooler to the second evaporative cooler on the first side and allow the airflow therethrough from the second evaporative cooler to the first evaporative cooler to flow from the second side to the first side.

According to various embodiments, the deflector may include a base layer comprising a plurality of openings adapted to allow the airflow through and a plurality of overhangs spaced apart from each other and overhanging the plurality of openings, such that the plurality of overhangs are adapted to allow the airflow from the plurality of openings to flow therebetween and prevent the waterflow into the plurality of openings and direct the waterflow into the second evaporative cooler.

According to various embodiments, the deflector may include a louvered panel comprising a plurality of overlapping panels and a plurality of gaps therebetween, such that, in operation, the waterflow from the first evaporative cooler flows onto the plurality of overlapping panels and may be directed into the second evaporative cooler and the airflow from the second evaporative cooler flows through the plurality of gaps.

According to various embodiments, the base layer may include the plurality of openings adapted to allow the airflow through, such that the base layer may be adapted to receive and channel the waterflow to the second evaporative cooler, and a top layer having the plurality of overhangs spaced apart from each other and overhanging the plurality of openings, such that the each of the plurality of overhangs may be adapted to receive and channel the waterflow to the base layer.

According to various embodiments, the base layer may include a plurality of channels spaced apart from each other to form the plurality of openings therebetween, such that the plurality of channels may be adapted to channel the waterflow to the second evaporative cooler, and such that the plurality of overhangs may include a plurality of channels.

According to various embodiments, the cooling apparatus may further include a plurality of guides spaced apart from each other and adapted to guide the airflow from the second evaporative cooler to the first evaporative cooler.

According to various embodiments, the plurality of guides may be adapted to guide the airflow from the second evaporative cooler to the deflector.

According to various embodiments, the first evaporative cooler may be disposed above the second evaporative cooler.

According to various embodiments, a cooling method adapted to cool a waterflow is provided. The method includes receiving an airflow through a first evaporative cooler from a second evaporative cooler to cool the waterflow through the first evaporative cooler, receiving an airflow through the second evaporative cooler to cool the waterflow from the first evaporative cooler through the second evaporative cooler, deflecting the waterflow from the first evaporative cooler to the first evaporative cooler and allowing the airflow from the second evaporative cooler to the first evaporative cooler by a deflector.

According to various embodiments, deflecting the waterflow and allowing the airflow may include channeling the waterflow from the first evaporative cooler to the second evaporative cooler and allowing the airflow from the second evaporative cooler to the first evaporative cooler through the deflector.

According to various embodiments, deflecting the waterflow and allowing the airflow may include directing the waterflow from the first evaporative cooler to the second evaporative cooler on a first side of the deflector and allowing the airflow from the second evaporative cooler to the first evaporative cooler to flow from a second side of the deflector to the first side.

According to various embodiments, deflecting the waterflow and allowing the airflow may include allowing the airflow through a plurality of openings of a base layer, allowing the airflow through the plurality of openings to flow between a plurality of overhangs spaced apart from each other and overhanging the plurality of openings, preventing the waterflow into the plurality of openings and directing the waterflow into the second evaporative cooler.

According to various embodiments, deflecting the waterflow and allowing the airflow may include allowing the airflow through a plurality of openings of a base layer for receiving and channeling the waterflow to the second evaporative cooler, receiving and channeling the waterflow to the base layer via a top layer comprising a plurality of overhangs spaced apart from each other and overhanging the plurality of openings.

According to various embodiments, the cooling method may further include guiding the airflow from the second evaporative cooler to the first evaporative cooler.

According to various embodiments, the cooling method may further include guiding the airflow from the second evaporative cooler to the deflector evaporative cooler.

DETAILED DESCRIPTION

In the following examples, reference will be made to the figures, in which identical features are designated with like numerals.

Figure 1:
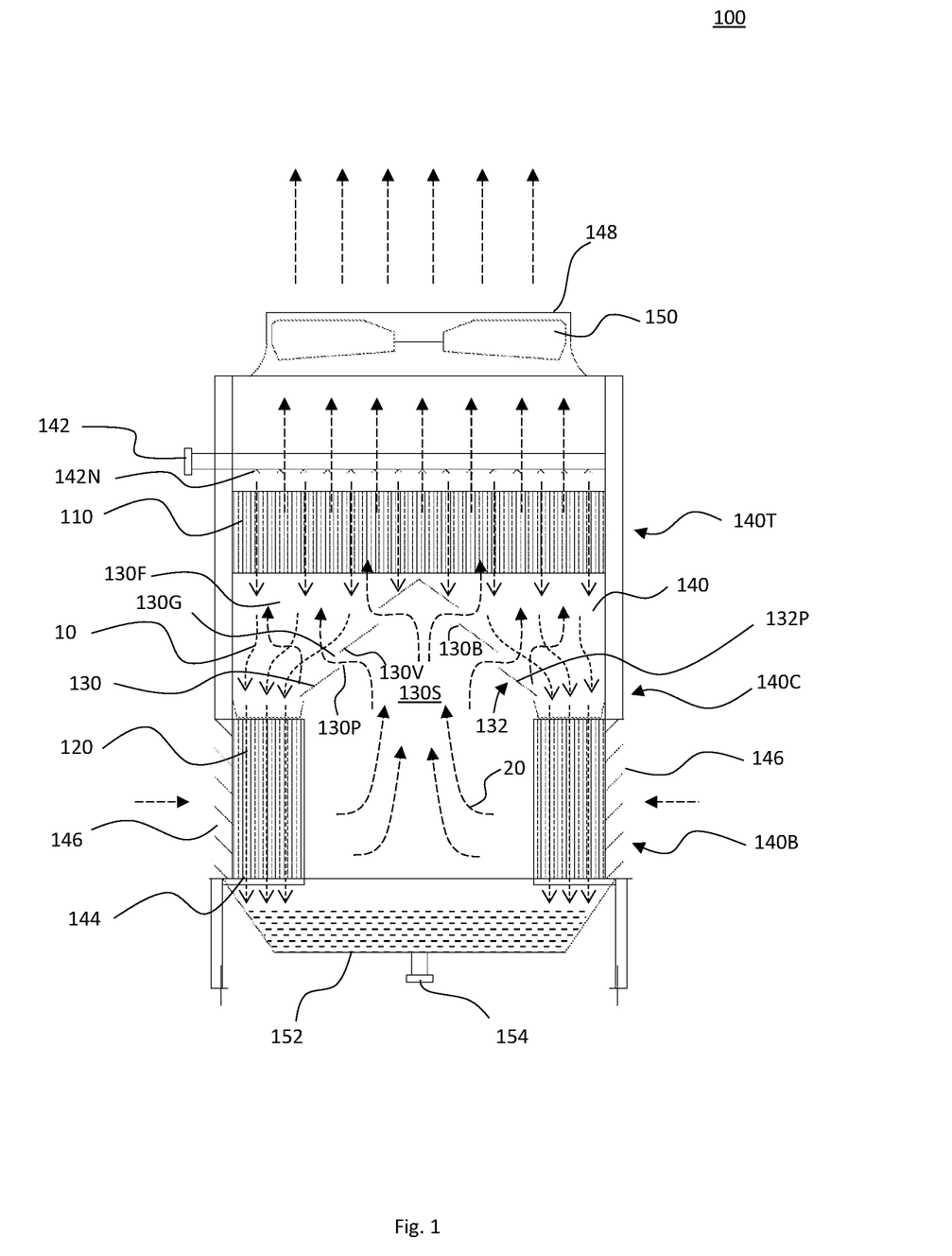
FIG. 1 shows a sectional view of an exemplary embodiment of a cooling apparatus for cooling a waterflow.

FIG. 1 shows a sectional view of an exemplary embodiment of a cooling apparatus 100 for cooling a waterflow 10. Cooling apparatus 100 includes a first evaporative cooler 110 adapted to cool the waterflow 10 therethrough, a second evaporative cooler 120 adapted to receive and cool the waterflow 10 from the first evaporative cooler 110 therethrough. Second evaporative cooler 120 is adapted to receive an airflow 20 therethrough to cool the waterflow 10 therethrough and the first evaporative cooler 110 is adapted to receive the airflow 20 therethrough from the second evaporative cooler 120 to cool the waterflow 10 therethrough. Cooling apparatus 100 includes a deflector 130 adapted to deflect the waterflow 10 from the first evaporative cooler 110 to the second evaporative cooler 120 and allow the airflow 20 therethrough from the second evaporative cooler 120 to the first evaporative cooler 110. First evaporative cooler 110 of the cooling apparatus 100 of the present invention may provide a thermal barrier to the waterflow 10 entering the cooling apparatus 100 such that the waterflow 10 may be evaporative cooled by the cooled airflow 20 from the second evaporative cooler 120. Cooled waterflow 10 from the first evaporative cooler 110 may be directed to the second evaporative cooler 120 to be further cooled. Compared to the conventional cooling tower with a heated waterflow entering the chamber and the infill, the thermal efficiency and effectiveness of the cooling apparatus 100 is relatively higher. Moreover, the waterflow 10 that is further cooled by the second evaporative cooler 120 cools the airflow 20 entering the cooling apparatus 100 further to a lower temperature as compared to the airflow temperature entering the conventional cooling tower via the cross-flow infill. Hence, the cooler airflow 20 from the second evaporative cooler 120 may be directed to the first evaporative cooler 110 to further cool the waterflow 10 entering the first evaporative cooler 110. As clearly shown the cooling effectiveness and efficiency of the cooling apparatus 100 is better and higher than the conventional cooling tower.

As shown in FIG. 1, the cooling apparatus 100 may include a chamber 140 having a top section 140T, a centre section 140C and a bottom section 140B. First evaporative cooler 110 may be disposed at the top section 140T and the second evaporative cooler 120 may be disposed at the bottom section 140B such that the first evaporative cooler 110 may be disposed above the second evaporative cooler 120. Deflector 130 may be disposed in the centre section 140C between the first evaporative cooler 110 and the second evaporative cooler 120. In terms of waterflow 10, the first evaporative cooler 110 may be considered to be disposed at upstream of the deflector 130 and the second evaporative cooler 120 may be considered to be disposed downstream thereof.

Referring to FIG. 1, the cooling apparatus 100 may include a water inlet 142 at the top section 140T and a water outlet 144 at the bottom section 140B such that the waterflow 10 enters the chamber 140 at the top section 140T and exits it at the bottom section 140B. Cooling apparatus 100 may include a plurality of nozzles 142N connected to the water inlet 142 and extending horizontally or laterally across the chamber 140 to distribute the waterflow 10 evenly across the width of the chamber 140. Cooling apparatus 100 may include an air inlet 146 at the bottom section 140B of the chamber 140 and an air outlet 148 at the top section 140T such that airflow 20 may enter the chamber 140 via the air inlet 146 at the bottom section 140B and exits via the air outlet 148 at the top section 140T. Cooling apparatus 100 may include more than one air inlet 146 and more than one water outlet 144. First evaporative cooler 110 may be disposed downstream or below the water inlet 142 to receive the waterflow 10. First evaporative cooler 110 may extend laterally or horizontally across the chamber 140 such that the waterflow 10 has to pass through it before being directed to the second evaporative cooler 120. First evaporative cooler 110 may be disposed below the plurality of nozzles 142N to receive the waterflow 10. Cooling apparatus 100 may include a fan 150 disposed across the air outlet 148 to draw the airflow 20 out from the chamber 140 from the top. As shown in FIG. 1, the fan 150 may be disposed above the plurality of nozzles 142N. First evaporative cooler 110 may be disposed below the fan 150. Second evaporative cooler 120 may be connected to the air inlet 146 to allow airflow 20 therethrough when it enters the chamber 140 and connected to the water outlet 144 to allow waterflow 10 therethrough when it exits the chamber 140. Second evaporative cooler 120 may be disposed downstream of the air inlet 146 to receive the airflow 20 entering the chamber 140 and upstream of the water outlet 144 to allow the waterflow 10 out of the chamber 140. Waterflow 10 exiting the chamber 140 may be collected in a water pan 152 fluidly connected to chamber 140. Water pan 152 may include a water channel 154 to channel the cooled water collected to be used where required, e.g. a condenser of a building. Waterflow 10 may be channeled directly from the water outlet 144 without a water pan 152. Second evaporative cooler 120 may extend longitudinally or vertically. As shown in FIG. 1, the waterflow 10 may flow through the second evaporative cooler 120 longitudinally and the airflow 20 may flow through the second evaporative cooler 120 laterally thus forming a cross-flow. Second evaporative cooler 120 may include one or more infills. As shown in FIG. 1, the second evaporative cooler 120 may include two infills disposed opposite each other at opposite sides of the chamber 140. Second evaporative cooler 120 may extend along the perimeter of the chamber 140 to surround the chamber 140. While the cooling apparatus 100 in FIG. 1 is shown as a vertical configuration, e.g. first evaporative cooler 110 disposed above the second evaporative cooler 120, it is possible for the cooling apparatus 100 to be arranged in a horizontal configuration such that the first evaporative cooler 110 and the second evaporative cooler 120 may be disposed laterally at the same height from the ground and the waterflow 10 from the first evaporative cooler 110 may be pumped into the second evaporative cooler 120 and the airflow 20 may be drawn laterally across both the first evaporative cooler 110 and the second evaporative cooler 120.

Figure 2:
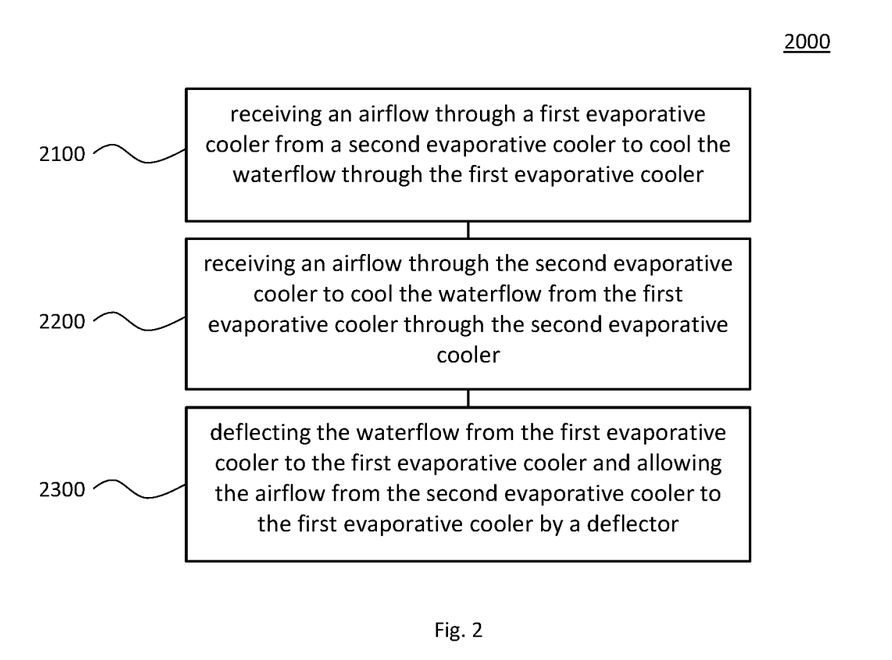
FIG. 2 shows a flowchart of a cooling method adapted to cool a waterflow.

FIG. 2 shows a flowchart of a cooling method 2000 adapted to cool the waterflow 10. Method 2000 includes receiving an airflow 20 through a first evaporative cooler 110 from a second evaporative cooler 120 to cool the waterflow 10 through the first evaporative cooler 110 in block 2100. Method 2000 further includes receiving the airflow 20 through the second evaporative cooler 120 to cool the waterflow 10 from the first evaporative cooler 110 through the second evaporative cooler 120 in block 2200. Method 2000 further includes deflecting the waterflow 10 from the first evaporative cooler 110 to the first evaporative cooler 110 and allowing the airflow 20 from the second evaporative cooler 120 to the first evaporative cooler 110 by a deflector 130 in block 2300. As described, the first evaporative cooler 110 may be adapted to allow the waterflow 10 from the plurality nozzles 142N to flow downwardly therethrough and the airflow 20 from the deflector 130 to flow upwardly therethrough. In this way, the first evaporative cooler 110 may be adapted to allow a counterflow between the waterflow 10 and the airflow 20. Consequently, the waterflow 10 may be cooled evaporatively as the airflow 20 passes through it. Second evaporative cooler 120 may be adapted to allow the waterflow 10 from the first evaporative cooler 110 to flow downwardly therethrough and the airflow 20 to flow across therethrough. In this way, the second evaporative cooler 120 may be adapted to allow a crossflow between the waterflow 10 and the airflow 20. Consequently, the waterflow 10 may be cooled evaporatively as the airflow 20 passes it. As such, the cooling apparatus 100 may be a two-stage cross-counter flow cooling apparatus 100.

When the cooling apparatus 100 is in operation, the waterflow 10, which may come from a heat source, e.g. condensers of buildings, has a relatively high temperature and may be channeled into the chamber 140 of the cooling apparatus 100. First evaporative cooler 110 may be adapted to receive the "heated" waterflow 10 therethrough. As the water is being sprayed from the plurality of nozzles 142N, it enters from top side of the first evaporative cooler 110 and exits from its bottom side. At the same time, the second evaporative cooler 120 may be adapted to receive the airflow 20 therethrough from the ambient air. As the airflow 20 from the second evaporative cooler 120 flows from the bottom side of the first evaporative cooler 110 and exits its top side, the airflow 20 evaporatively cools the waterflow 10 therethrough, i.e. counterflow. The downward waterflow 10 is made to contact the upward airflow 20 thus cooling down the waterflow 10 therethrough. The temperature of the waterflow 10 that exits the first evaporative cooler 110 is cooler than the temperature of the "heated" waterflow 10 that enters the first evaporative cooler 110. In turn, the airflow 20 is heated to nearly the temperature of the incoming waterflow 10 and is saturated with water vapour. In this way, the thermal cooling capacity of the first evaporative cooler 110 is maximized Preferably, the temperature of exiting the first evaporative cooler 110 is uniform across it and the temperature of airflow 20 exiting from the top side of the first evaporative cooler 110 is uniform across it.

Waterflow 10 from the first evaporative cooler 110 may be deflected into the second evaporative cooler 120 by the deflector 130. Second evaporative cooler 120 may receive the waterflow 10 therethrough and as the airflow 20 flows therethrough, the waterflow 10 may be evaporatively cooled by the airflow 20, e.g. cross-flow. Hence, the temperature of the waterflow 10 exiting the second evaporative cooler 120 may be cooler than the temperature entering the second evaporative cooler 120. Consequently, the airflow 20 picks up heat and moisture from the waterflow 10. Airflow 20 that subsequently enters the chamber 140 via the second evaporative cooler 120 may be cooled by the "cooled" second evaporative cooler 120 and the cooled airflow 20 may then be directed through the deflector 130 and the first evaporative cooler 110 to further cool the waterflow 10 through the first evaporative cooler 110. In this way, the waterflow 10 is cooled before entering the second evaporative cooler 120 which cools the airflow 20 therethrough. As shown, the continuous cooling cycle improves the thermal efficiency and effectiveness of the cooling apparatus 100.

Referring to FIG. 1, the deflector 130 may include a first side 130F and a second side 130S behind the first side 130F. Deflector 130 may be adapted to direct the waterflow 10 from the first evaporative cooler 110 to the second evaporative cooler 120 on the first side 130F and allow the airflow 20 therethrough from the second evaporative cooler 120 to the first evaporative cooler 110 to flow from the second side 130S to the first side 130F. Due to the design of the deflector 130, the waterflow 10 may not flow from the first side 130F to the second side 130S. In addition, the waterflow 10 from the first evaporative cooler 110 may be directed into the second evaporative cooler 120 and prevented from escaping into the second side 130S, e.g. into the water pan 152, and mixed with the cooled water therein without first being used to cooled by the second evaporative cooler 120. Deflector 130 may also achieve the effect of separating the waterflow 10 and the airflow 20, such that the waterflow 10 exiting from the first evaporative cooler 110 may be directed to the top of the second evaporative cooler 120.

Deflector 130 may include a base layer 130B having a plurality of openings 130P adapted to allow the airflow 20 through and a plurality of overhangs 130V spaced apart from each other and overhanging the plurality of openings 130P. Plurality of overhangs 130V may be adapted to allow the airflow 20 from the plurality of openings 130P to flow therebetween and prevent the waterflow 10 into the plurality of openings 130P and direct the waterflow 10 into the second evaporative cooler 120.

Referring to FIG. 1, the deflector 130 may include a louvered panel 132 having a plurality of overlapping panels 132P and a plurality of gaps 132G therebetween. In operation, the waterflow 10 from the first evaporative cooler 110 flows onto the plurality of overlapping panels 132P and is directed into the second evaporative cooler 120 and the airflow 20 from the second evaporative cooler 120 flows through the plurality of gaps 132G.

Figure 3A:
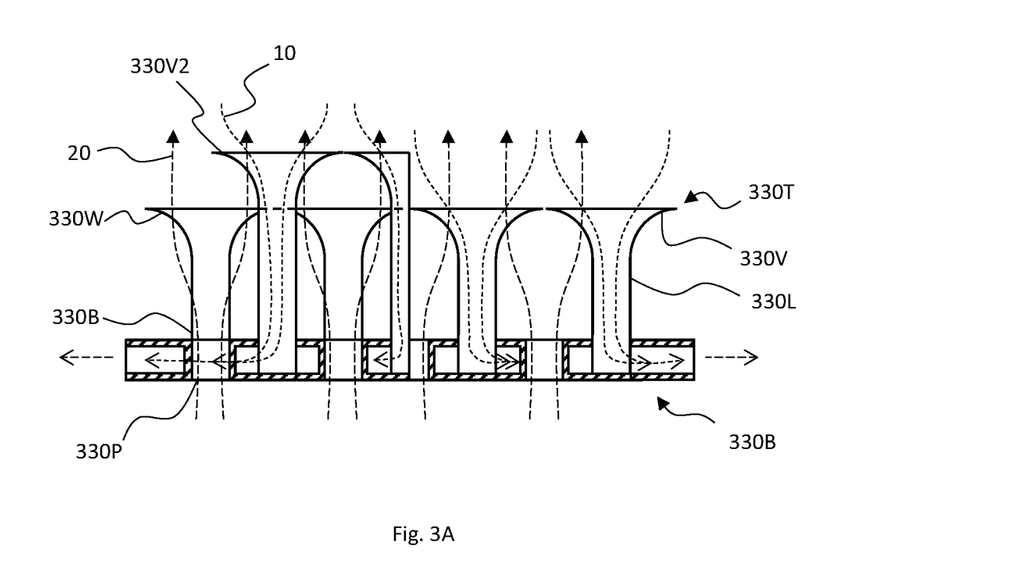
FIG. 3A shows a sectional view of an exemplary embodiment of a deflector.
Figure 3B:
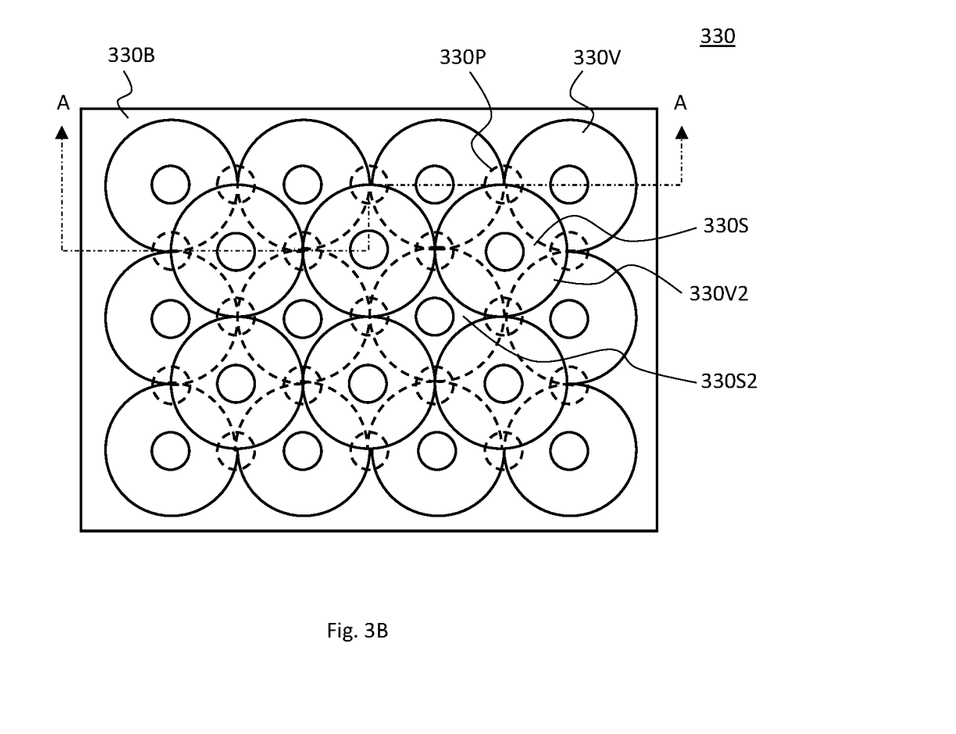
FIG. 3B shows a top view of an exemplary embodiment of the deflector as shown in FIG. 3A.

FIG. 3A shows a sectional view of an exemplary embodiment of a deflector 330. FIG. 3A is a sectional view along line A-A in FIG. 3B. Deflector 330 may include the base layer 330B having the plurality of openings 330P adapted to allow the airflow 20 through. Base layer 330B may also be adapted to receive and channel the waterflow 10 to the second evaporative cooler 320 (not shown in FIG. 3A). Deflector 330 may also include a top layer 330T having the plurality of overhangs 330V spaced apart from each other and overhanging the plurality of openings 330P. Each of the plurality of overhangs 330V may be adapted to receive and channel the waterflow 10 to the base layer 330B. As shown in FIG. 3A, the base layer 330B may be a covered tray and the plurality of openings 330P may be a plurality of through holes for the airflow 20 to go through. Base layer 330B may be in fluid communication with the second evaporative cooler 320 such that waterflow 10 collected therein may be channeled to the second evaporative cooler 320. Each of the plurality of overhangs 330V may extend from the base layer 330B. Each of the plurality of overhangs 330V may include a funnel 330L with a wide top 330W that overhangs the openings 330P and a narrow bottom 330B connected to the base layer 330B. Each of plurality of overhangs 330V may be in fluid communication with the base layer 330B such that the waterflow 10 flowing thereinto may flow into the base layer 330B, which may direct the waterflow 10 to the second evaporative cooler 320. Top layer 330T may include a plurality of secondary overhangs 330V2 overhanging the plurality of overhangs 330V. Each of the plurality of secondary overhangs 330V2 may extend from the base layer 330B and extend through the plurality of overhangs 330V. Each of the plurality of secondary overhangs 330V2 may be adapted to receive and channel the waterflow 10 to the base layer 330B. Each of the plurality of secondary overhangs 330V2 may include the funnel 330L with a wide top 330W that overhangs a plurality of spaces (as shown in FIG. 3B) formed by the plurality of overhangs 330V and a narrow bottom 330B connected to the base layer 330B. Each of plurality of secondary overhangs 330V2 may be in fluid communication with the base layer 330B such that the waterflow 10 flowing thereinto may flow into the base layer 330B, which may direct the waterflow 10 to the second evaporative cooler 320. Base layer 330B may be inclined to improve the waterflow 10 therein to the second evaporative cooler 320.

FIG. 3B shows a top view of an exemplary embodiment of the deflector 330 as shown in FIG. 3A. As shown in FIG. 3B, the plurality of overhangs 330V may form a plurality of spaces 330S between each other. Airflow 20 from the plurality of openings 330P may flow through the plurality of spaces 330S. Plurality of secondary overhangs 330V2 may be adapted to overhang the plurality of spaces 330S to prevent the waterflow 10 into the plurality of spaces 330S. Plurality of secondary overhangs 330V2 may form a plurality of secondary spaces 330S2 between each other. Waterflow 10 from the first evaporative cooler 310 may flow into the plurality of secondary overhangs 330V2 to be directed into the base layer 330B and the plurality of secondary spaces 330S2. Portions of the waterflow 10 that flows through the plurality of secondary spaces 330S2 may be received by the plurality of overhangs 330V and directed into the base layer 330B. Airflow 20 from the plurality of spaces 330S may flow through the plurality of secondary spaces 330S2 and to the first evaporative cooler 310 (not shown in FIG. 3B). As shown in FIG. 3A and FIG. 3B, the deflector 330 may be adapted to direct the waterflow 10 from the first evaporative cooler 310 (not shown in FIG. 3A and FIG. 3B) to the second evaporative cooler 320 (not shown in FIG. 3A) without allowing the waterflow 10 therethrough and allow the airflow 20 therethrough from the second evaporative cooler 320 to the first evaporative cooler 310. Referring to FIG. 3B, while it is shown that the plurality of overhangs 330V and the plurality of secondary overhangs 330V2 may have a circular top profile, they may have other top profiles, e.g. square, octagonal, etc. From the top view of the deflector 330 as shown in FIG. 3B, the deflector 330 may provide a complete barrier to the waterflow 10 from the first evaporative cooler 310 and direct the waterflow 10 to the second evaporative cooler 310. At the same time, the deflector 330 may allow the airflow 20 from the second evaporative cooler 320 to pass through to the first evaporative cooler 310.

Figure 4A:
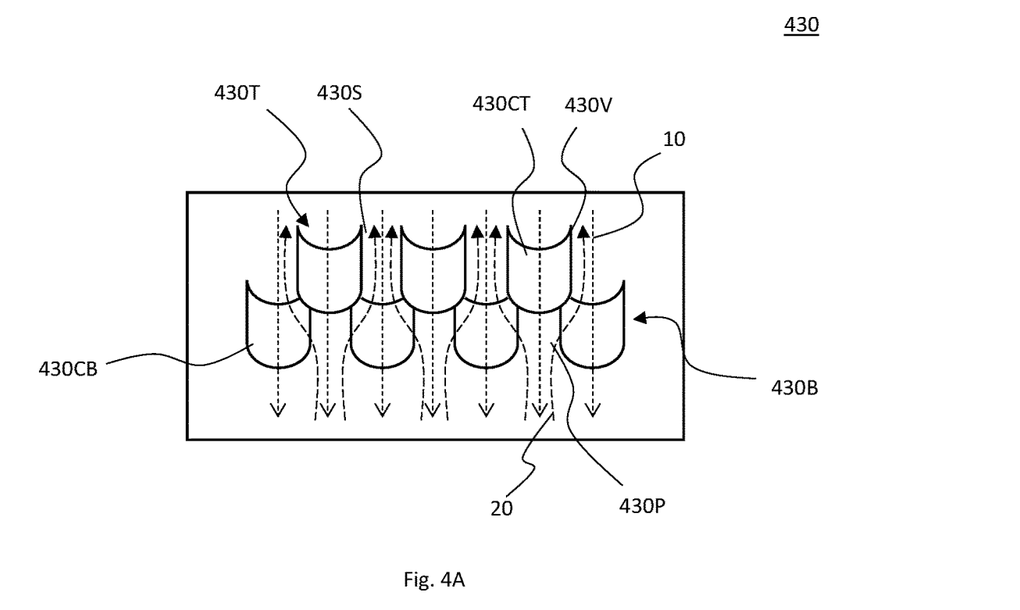
FIG. 4A shows a sectional view of an exemplary embodiment of a deflector.

FIG. 4A shows a sectional view of an exemplary embodiment of a deflector 430. FIG. 4A is a sectional view along line B-B in FIG. 4B. Deflector 430 may include the base layer 430B having the plurality of openings 430P adapted to allow the airflow 20 therethrough and the plurality of overhangs 430V spaced apart from each other and overhanging the plurality of openings 430P. Plurality of overhangs 430V may be adapted to allow the airflow 20 from the plurality of openings 430P to flow therebetween and prevent the waterflow 10 into the plurality of openings 430P. In addition, the plurality of overhangs 430V may be adapted to direct the waterflow 10 into the second evaporative cooler 420 (not shown in FIG. 4A). As shown in FIG. 4A, the base layer 430B may include a plurality of bottom channels 430CB spaced apart from each other to form the plurality of openings 430P therebetween, such that the plurality of bottom channels 430CB may be adapted to channel the waterflow 10 to the second evaporative cooler 420. Plurality of overhangs 430V may include a plurality of top channels 430CT adapted to direct the waterflow 10 to the second evaporative cooler 420. Plurality of top channels 430CT may form the plurality of spaces 430S therebetween. Plurality of top channels 430CT may be disposed above the plurality of openings 430P and overlap the plurality of bottom channels 430CB to ensure that the waterflow 10 that flows through the plurality of spaces 430S may be received by the plurality of bottom channels 430CB to be directed to the second evaporative cooler 420. At the same time, the airflow 20 from the second evaporative cooler 420 may pass through the plurality of openings 430P and the plurality of spaces 430S to first evaporative cooler 410.

Figure 4B:
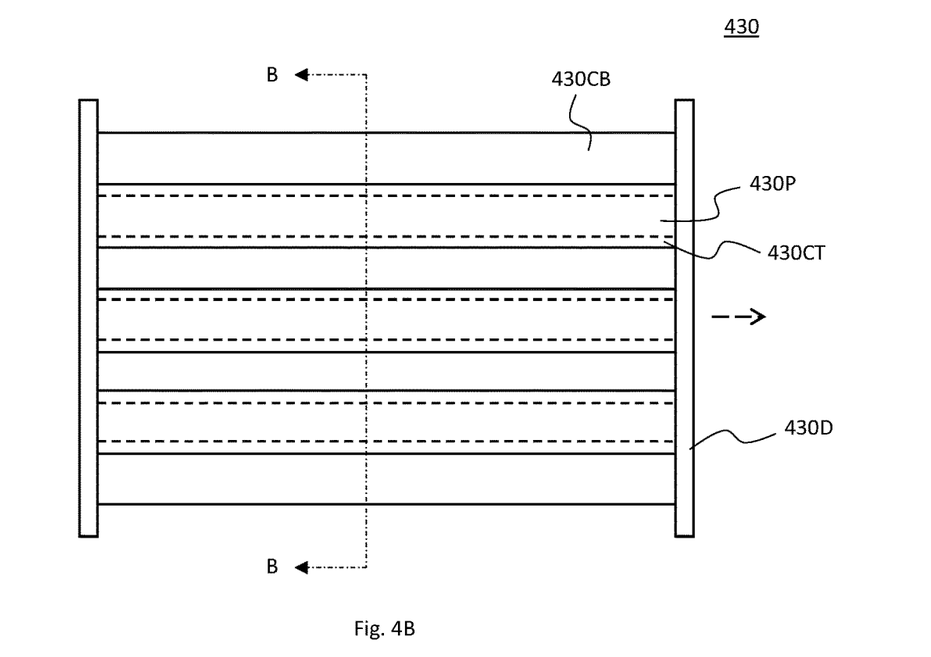
FIG. 4B shows a top view of the exemplary embodiment of the deflector as shown in FIG. 4A.

FIG. 4B shows a top view of the exemplary embodiment of the deflector 430 as shown in FIG. 4A. As shown in FIG. 4B, the plurality of bottom channels 430CB may form a plurality of openings 430P therebetween and the plurality of top channels 430CT may be disposed over the plurality of openings 430P and overlap the plurality of bottom channels 430CB to prevent the waterflow 10 through the plurality of spaces 430S to enter the plurality of openings 430P. Deflector 430 may include a side channel 430D in fluid communication with the plurality of base layer 430B and the plurality of overhangs 430V, such that the side channel 430D may be adapted to receive the waterflow 10 from the base layer 430B and the plurality of overhangs 430V and direct the waterflow 10 to the second evaporative cooler 420 (not shown in FIG. 4B). From the top view of the deflector 430 as shown in FIG. 4B, the deflector 430 may provide a complete barrier to the waterflow 10 from the first evaporative cooler 410 and direct the waterflow 10 to the second evaporative cooler 410. At the same time, the deflector 430 may allow the airflow 20 from the second evaporative cooler 420 to pass through to the first evaporative cooler 410.

Figure 4C:
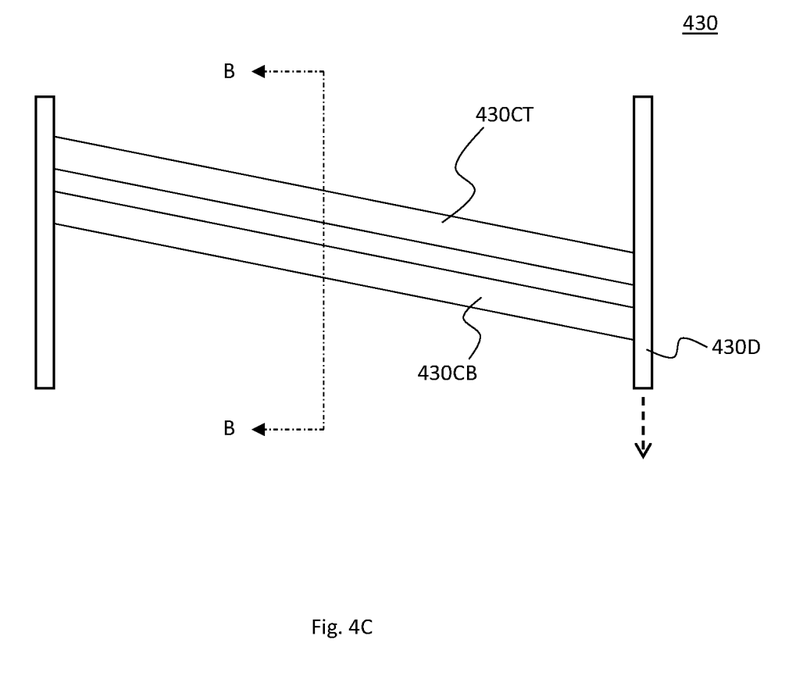
FIG. 4C shows a side elevation view of the exemplary embodiment of the deflector as shown in FIG. 4A.

FIG. 4C shows a side elevation view of the exemplary embodiment of the deflector 430 as shown in FIG. 4A. As shown in FIG. 4C, the plurality of top channels 430CT may be disposed above the plurality of bottom channels 430CB. Both the plurality of top channels 430CT and the plurality of bottom channels 430CB may be inclined to direct the waterflow 10 to the side channel 430D. Both the plurality of top channels 430CT and the plurality of bottom channels 430CB may form a set of channels and there may be more than one set of channels disposed above each other in a deflector 430. Further, the sets of channels may be inclined alternately to form a zig-zag configuration.

Figure 5:
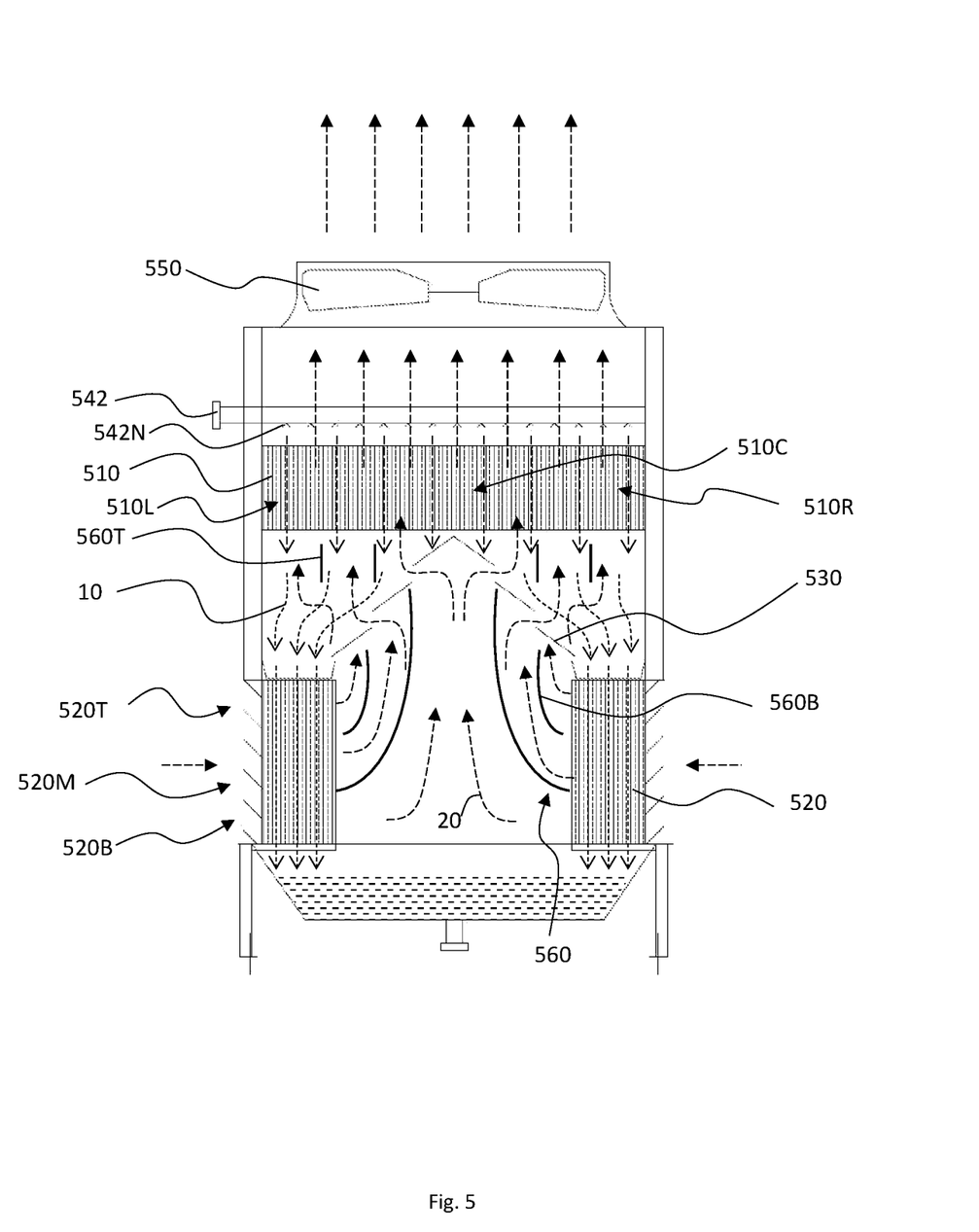
FIG. 5 shows a sectional view of an exemplary embodiment of the cooling apparatus.

FIG. 5 shows a sectional view of an exemplary embodiment of the cooling apparatus 500. Cooling apparatus 500 may include the features described in the cooling apparatus 100 in FIG. 1. Cooling apparatus 500 may further include a plurality of guides 560 spaced apart from each other and adapted to guide the airflow 20 from the second evaporative cooler 520 to the first evaporative cooler 510. Plurality of guides 560 may include a plurality of parallel panels adapted to direct the airflow 20 from the second evaporative cooler 520 to the deflector 530.

Second evaporative cooler 520 may be sectioned into a plurality of portions, e.g. a top portion 520T, bottom portion 520B and a middle portion 520M between the top portion 520T and the bottom portion 520B. As the waterflow 10 flows through the second evaporative cooler 520 from the top portion 520T to the bottom portion 520B, the waterflow 10 is cooled by the airflow 20 as it flows downwards. As a result, the waterflow 10 cools down further as it flows down the second evaporative cooler 520. As it can be appreciated, the waterflow 10 at the top portion 520T of the second evaporative cooler 520 has a higher temperature than the waterflow 10 at the bottom portion 520B of the second evaporative cooler 520 due to the cooling effect downstream. Therefore, the temperature of the waterflow 10, hence the temperature at the bottom portion 520B of the second evaporative cooler 520 may be cooler than the temperature at its top portion 520T. The airflow 20 exiting the second evaporative cooler 520 is saturated and at the same time, the temperature of the airflow 20 exiting from the top portion 520T of the second evaporative cooler 520 may consequently be higher than the airflow 20 exiting from the bottom portion 520B of the second evaporative cooler 520 due to the temperature of the waterflow 10 therethrough. As such, it can be appreciated that there is a temperature gradient along the longitudinal direction, i.e. vertical direction, of the second evaporative cooler 520 such that the temperature of the airflow 20 and waterflow 10 therethrough gradually reduces from the top portion 520T of the second evaporative cooler 520 to its bottom portion 520B. It can also be appreciated that the temperature of the waterflow 10 exiting the first evaporative cooler 510 may be the same or nearly the same as the temperature of the waterflow 10 entering the second evaporative cooler 520. As the waterflow 10 flows downwardly from the first evaporative cooler 510 to the second evaporative cooler 520, the waterflow 10 may be evaporatively cooled by the airflow 20 flowing in the opposite direction. Hence, the temperature of the waterflow 10 entering the second evaporative cooler 520 may be lower than the temperature of the waterflow 10 exiting first evaporative cooler 510. It can be appreciated that due to the temperature gradient of the airflow 20 exiting from the second evaporative cooler 520, the average temperature of the airflow 20 entering the first evaporative cooler 510 is always lower than the temperature of waterflow 10 exiting the first evaporative cooler 510, regardless the external conditions of the water and air, i.e. temperature of water entering the cooling apparatus 500 from the condensers, and the temperature and humidity of the ambient air.

First evaporative cooler 510 may also be sectioned into a plurality of portions, e.g. a left side portion 510L, a right side portion 510R and a centre portion 510C between the left side portion 510L and the right side portion 510R. Plurality of guides 560 may be adapted to guide airflow 20 from one portion of the second evaporative cooler 520 to one portion of the first evaporative cooler 510. For example, the plurality of guides 560 may be adapted to guide the airflow 20 from the top portion 520T of the second evaporative cooler 520 to one of the left side portion 510L and right side portion 510R, the airflow 20 from the bottom portion 520B to the centre portion 510C. In this way, the airflow 20 from the plurality of portions of the second evaporative cooler 520, which have varying temperatures, e.g. warmest at the top portion 520T and coolest at the bottom portion 520B, may not be mixed as it flows from the second evaporative cooler 520 to the first evaporative cooler 510. Plurality of guides 560 may include a plurality of bottom guides 560B disposed between the second evaporative cooler 520 and the deflector 530 to guide the airflow 20 from the second evaporative cooler 520 to the deflector 530. Plurality of guides 560 may include a plurality of top guides 560T disposed between the deflector 530 and the first evaporative cooler 510 to guide the airflow 20 from the deflector 530 to the first evaporative cooler 510. As the portions of airflow 20 from the second evaporative cooler 520 are guided by the plurality of bottom guides 560B to the deflector 530 and flows through the deflector 530, the same portions of airflow 20 may be guided by the plurality of top guides 560T from the deflector 530 to the respective portions of the first evaporative cooler 510. For example, the portion of airflow 20 at the top portion 520T of the left side and right side of the second evaporative cooler 520 may be directed to the left side portion 510L and right side portion 510R of the first evaporative cooler 510. The portion of airflow 20 at the bottom portion 520B of the left side and right side of the second evaporative cooler 520 may be directed to the centre portion 510C of the first evaporative cooler 510. In this way, the airflow 20 exiting from the second evaporative cooler 520 may be directed to the first evaporative cooler 510 with minimal interference hence reducing the resistance of the water flow and airflow 20 between the airflow 20 and waterflow 10.

It can be appreciated that the cooling apparatus 500 provides a stable feedback cooling loop. When the water, e.g. from the condenser at high temperature, enters the cooling apparatus 500 via the water inlet 542, the waterflow 10 is being sprayed onto the first evaporative cooler 510 using the plurality of nozzles 542N. As the waterflow 10 flows through the first evaporative cooler 510, it is cooled by the counterflow airflow 20 before exiting the first evaporative cooler 510. A cooling effect is produced through the first evaporative cooler 510 and especially at the bottom side thereof, thus reducing the temperature of the waterflow 10 exiting from the bottom side of the first evaporative cooler 510. Consequently, the temperature of the waterflow 10 entering the second evaporative cooler 520 is reduced compared to a cooling apparatus 500 without the first evaporative cooler 510. In turn, due to the cooling effect of the cross-flow between the waterflow 10 and the airflow 20 within the second evaporative cooler 520, the temperature of the waterflow 10 exiting the second evaporative cooler 520 at its bottom portion 520B is further reduced. As such, the temperature of the airflow 20 exiting from the second evaporative cooler 520 is much lower compared to the waterflow 10 entering the second evaporative cooler 520. Due to the lowered temperature of the waterflow 10 in the second evaporative cooler 520 as a result of the cooling effect by the first evaporative cooler 510 and the second evaporative cooler 520, the incoming airflow 20, i.e. ambient air, into the second evaporative cooler 520 may be cooled to a temperature lower than that of a conventional cooling tower. Consequently, the cooled airflow 20 exiting from the second evaporative cooler 520 may be channeled into the first evaporative cooler 510 to improve the cooling effect at the first evaporative cooler 510. The cooled airflow 20 may be evaporatively cooled further in the first evaporative cooler 510 and at the same time, due to the cooled first evaporative cooler 510, the waterflow 10 through it may be cooled further before being directed into the second evaporative cooler 520 again. As one may appreciate, the feedback cooling loop enhances the thermal effectiveness of the cooling apparatus 500 and produces colder waterflow 10 as compared to a conventional cross-flow cooling tower. Further, the present cooling apparatus 500 produces a lower air-flow resistance as compared to a conventional counterflow cooling tower.

As shown, the cooling apparatus 500 of the present invention has a higher thermal efficiency than a conventional cross-flow cooling tower. As shown above, the feedback cooling loop increases the effectiveness of the cooling effect in the second evaporative cooler 520. Due to the improved cooling efficiency, some of the physical and operational parameters used for the cooling apparatus 500 of the present invention may be reduced to achieve the same results as a conventional cooling tower. For example, the width of the second evaporative cooler 520 may be narrower than that of the cross-flow infills used in a conventional cooling tower. The electric consumption of the fan 550 for the present cooling apparatus 500 may be lower than that of a conventional cooling tower. Alternatively, a lower power exhaust fan may be used. While it is not shown, the cooling apparatus 500 of the present invention does not require additional power consumption, e.g. no additional pump required. Consequently, there will be savings in the power consumption. As the size of the physical parameters, e.g. size of fan 550 and first evaporative cooler 510, are reduced, the size of the cooling apparatus 500 may be smaller than that of a conventional cooling tower of the same cooling efficiency. As a result, the present cooling apparatus 500 may be more compact and has a smaller footprint than a conventional cooling tower. As such, for the same space, it may be possible to install more cooling apparatus 500. In terms of part costs and maintenance, it is more cost effective to purchase or replace a smaller fan 550 and evaporative coolers 510, 520. As it can be appreciated, the abovementioned will result in cost savings now and in the long term.

A skilled person would appreciate that the features described in one example may not be restricted to that example and may be combined with any one of the other examples.

The present invention relates to a cooling apparatus and a cooling method generally as herein described, with reference to and/or illustrated in the accompanying drawings.

The invention claimed is:

1. A cooling apparatus for cooling a waterflow, the cooling apparatus comprising:
a counterflow evaporative cooler adapted to cool the waterflow therethrough longitudinally;
a crossflow evaporative cooler adapted to receive and further cool the cooled waterflow from the counterflow evaporative cooler therethrough longitudinally, wherein the crossflow evaporative cooler comprises a one side, an opposite side opposite the one side, a top side and a bottom side opposite the top side, wherein the top side and the bottom side extend from the one side to the opposite side;
wherein the crossflow evaporative cooler is adapted to receive an airflow to flow laterally therethrough to further cool the cooled waterflow therethrough forming a cross-flow with the cooled waterflow, wherein the airflow enters the crossflow evaporative cooler at the one side and exits the crossflow evaporative cooler at the opposite side without exiting the top side and the cooled waterflow flows into the crossflow evaporative cooler at the top side and exits the crossflow evaporative cooler at the bottom side, wherein the cooled waterflow cools the airflow therethrough and the counterflow evaporative cooler is adapted to receive the cooled airflow therethrough longitudinally from the crossflow evaporative cooler to cool the waterflow therethrough; and
a deflector adapted to deflect the cooled waterflow from the counterflow evaporative cooler to the crossflow evaporative cooler and allow the cooled airflow to flow from the crossflow evaporative cooler to the counterflow evaporative cooler therethrough, and separate the cooled airflow exiting the crossflow evaporative cooler from the cooled waterflow entering the crossflow evaporative cooler, wherein the cooled airflow from the crossflow evaporative cooler is directed through the deflector to the counterflow evaporative cooler, wherein the cooled waterflow is cooled further by the cooled airflow before entering the crossflow evaporative cooler such that a temperature of the further cooled waterflow entering the crossflow evaporative cooler is lower than the temperature of the waterflow exiting the counterflow evaporative cooler.

2. The cooling apparatus according to claim 1, wherein the deflector comprises a first side and a second side behind the first side, wherein the deflector is adapted to direct the waterflow from the counterflow evaporative cooler to the crossflow evaporative cooler along the first side and allow the airflow from the crossflow evaporative cooler to the counterflow evaporative cooler to flow therethrough from the second side to the first side.

3. The cooling apparatus according to claim 1, wherein the deflector comprises a base layer comprising a plurality of openings adapted to allow the airflow through and a plurality of overhangs spaced apart from each other and overhanging the plurality of openings, wherein the plurality of overhangs are adapted to allow the airflow from the plurality of openings to flow therebetween and prevent the waterflow into the plurality of openings and direct the waterflow into the crossflow evaporative cooler.

4. The cooling apparatus according to claim 1, wherein the deflector comprises a louvered panel comprising a plurality of overlapping panels and a plurality of gaps therebetween, wherein, in operation, the waterflow from the counterflow evaporative cooler flows onto the plurality of overlapping panels and is directed into the crossflow evaporative cooler and the airflow from the crossflow evaporative cooler flows through the plurality of gaps.

5. The cooling apparatus according to claim 3, wherein the base layer comprising the plurality of openings adapted to allow the airflow through, wherein the base layer is adapted to receive and channel the waterflow to the crossflow evaporative cooler, and a top layer comprising the plurality of overhangs spaced apart from each other and overhanging the plurality of openings, wherein the each of the plurality of overhangs are adapted to receive and channel the waterflow to the base layer.

6. The cooling apparatus according to claim 3, wherein the base layer comprises a plurality of channels spaced apart from each other to form the plurality of openings therebetween, wherein the plurality of channels are adapted to channel the waterflow to the crossflow evaporative cooler, and wherein the plurality of overhangs comprises a plurality of channels.

7. The cooling apparatus according to claim 1, wherein the counterflow evaporative cooler comprises a left side portion, a right side portion, and a center portion between the left side portion and the right side portion, the crossflow evaporative cooler comprises a top portion, a bottom portion, and a middle portion between the top portion and the bottom portion, wherein the cooling apparatus further comprises a plurality of guides spaced apart from each other and adapted to guide the airflow from the top portion to one of the left side portion and the right side portion and the airflow from the bottom portion to the center portion.

8. The cooling apparatus according to claim 7, wherein the plurality of guides are adapted to guide the airflow from the crossflow evaporative cooler to the deflector.

9. The cooling apparatus according to claim 1, further comprising a chamber, wherein the counterflow evaporative cooler extends laterally across the chamber, wherein the waterflow has to pass therethrough before being directed to the crossflow evaporative cooler.

10. A cooling method adapted to cool a waterflow, the method comprising,
receiving a cooled airflow through a counterflow evaporative cooler from a crossflow evaporative cooler longitudinally to cool the waterflow through the counterflow evaporative cooler longitudinally;
receiving an airflow to flow laterally through the crossflow evaporative cooler to further cool the cooled waterflow from the counterflow evaporative cooler through the crossflow evaporative cooler longitudinally, wherein the crossflow evaporative cooler comprises a one side, an opposite side opposite the one side, a top side and a bottom side opposite the top side, wherein the top side and the bottom side extend from the one side to the opposite side, wherein the airflow enters the crossflow evaporative cooler at the one side and exits the crossflow evaporative cooler at the opposite side without exiting the top side and the cooled waterflow flows into the crossflow evaporative cooler at the top side and exits the crossflow evaporative cooler at the bottom side, wherein the cooled waterflow cools the airflow through the crossflow evaporative cooler, wherein the cooled airflow is received by the counterflow evaporative cooler therethrough longitudinally to cool the waterflow therethrough; and
deflecting the cooled waterflow from the counterflow evaporative cooler to the crossflow evaporative cooler and allowing the cooled airflow from the crossflow evaporative cooler to the counterflow evaporative cooler through a deflector, wherein the cooled airflow exiting the crossflow evaporative cooler is separated from the cooled waterflow entering the crossflow evaporative cooler, wherein the cooled airflow from the crossflow evaporative cooler is directed through the deflector to the counterflow evaporative cooler, wherein the cooled waterflow is cooled further by the cooled airflow before entering the crossflow evaporative cooler such that a temperature of the further cooled waterflow entering the crossflow evaporative cooler is lower than the temperature of the waterflow exiting the counterflow evaporative cooler.

11. The method according to claim 10, deflecting the waterflow and allowing the airflow comprises channeling the waterflow from the counterflow evaporative cooler to the crossflow evaporative cooler and allowing the airflow from the crossflow evaporative cooler to the counterflow evaporative cooler through the deflector.

12. The method according to claim 10, deflecting the waterflow and allowing the airflow comprises directing the waterflow from the counterflow evaporative cooler to the crossflow evaporative cooler on a first side of the deflector and allowing the airflow from the crossflow evaporative cooler to the counterflow evaporative cooler to flow from a second side of the deflector to the first side.

13. The method according to claim 10, wherein deflecting the waterflow and allowing the airflow comprises allowing the airflow through a plurality of openings of a base layer, allowing the airflow through the plurality of openings to flow between a plurality of overhangs spaced apart from each other and overhanging the plurality of openings, preventing the waterflow into the plurality of openings and directing the waterflow into the crossflow evaporative cooler.

14. The method according to claim 10, wherein deflecting the waterflow and allowing the airflow comprises allowing the airflow through a plurality of openings of a base layer for receiving and channeling the waterflow to the crossflow evaporative cooler, receiving and channeling the waterflow to the base layer via a top layer comprising a plurality of overhangs spaced apart from each other and overhanging the plurality of openings.

15. The method according to claim 10, further comprising guiding the airflow from the crossflow evaporative cooler to the counterflow evaporative cooler.

16. The method according to claim 10, further comprising guiding the airflow from the crossflow evaporative cooler to the deflector.

17. The method according to claim 10, wherein the counterflow evaporative cooler comprises a left side portion, a right side portion, and a center portion between the left side portion and the right side portion and the crossflow evaporative cooler comprises a top portion, a bottom portion, and a middle portion between the top portion and the bottom portion.

18. The method according to claim 17, further comprising guiding the airflow from the top portion to one of the left side portion and the right side portion and the airflow from the bottom portion to the center portion.

* * * * *